United States Patent

Pozzobon et al.

Patent Number: 5,536,026
Date of Patent: Jul. 16, 1996

[54] POWER GENERATOR DEVICE PARTICULARLY FOR WHEELED SPORT IMPLEMENTS

[75] Inventors: Alessandro Pozzobon, Paderno Di Ponzano Veneto; Bruno Borsoi, Conegliano; Adolfo Pozzebon, Sala D'Istrana, all of Italy

[73] Assignee: Nordica S.p.A., Montebelluna, Italy

[21] Appl. No.: 376,195

[22] Filed: Jan. 20, 1995

Related U.S. Application Data

[62] Division of Ser. No. 39,475, filed as PCT/EP92/02004, Aug. 31, 1992, Pat. No. 5,390,941.

[30] Foreign Application Priority Data

Sep. 6, 1991 [IT] Italy ................... MI91A2355
Sep. 6, 1991 [IT] Italy ................... MI91A2357
Sep. 6, 1991 [IT] Italy ................... MI91A2372

[51] Int. Cl.⁶ ................................. A63C 17/06
[52] U.S. Cl. ................. 280/11.22; 280/11.19; 362/78
[58] Field of Search ............. 280/11.19, 11.22, 280/11.23, 11.27, 811, 816; 362/78, 103

[56] References Cited

U.S. PATENT DOCUMENTS

| | | | |
|---|---|---|---|
| 2,505,154 | 4/1950 | Smith | 280/11.22 X |
| 2,931,012 | 3/1960 | Kosach | 363/103 X |
| 3,302,954 | 2/1967 | Elwell | 280/11.19 |
| 4,298,910 | 11/1981 | Price | 280/11.19 X |
| 4,363,502 | 12/1982 | Bakerman | 280/816 |
| 4,383,244 | 5/1983 | Knauff | 280/11.19 X |
| 4,429,232 | 1/1984 | Thomas et al. | 280/11.19 X |
| 4,775,919 | 10/1988 | Pearsall et al. | 362/78 |
| 5,390,941 | 2/1995 | Pozzobon et al. | 280/11.19 |
| 5,413,380 | 5/1995 | Fernandez | 280/11.19 X |

*Primary Examiner*—Brian L. Johnson
*Attorney, Agent, or Firm*—Guido Modiano; Albert Josif

[57] ABSTRACT

A power generator device in combination with a wheeled sports implement, including first magnets supported by a hub of a wheel, second magnets supported by a pair of wings of a support which rotatably supports the wheel, and windings interposed between the first and second magnets.

3 Claims, 7 Drawing Sheets

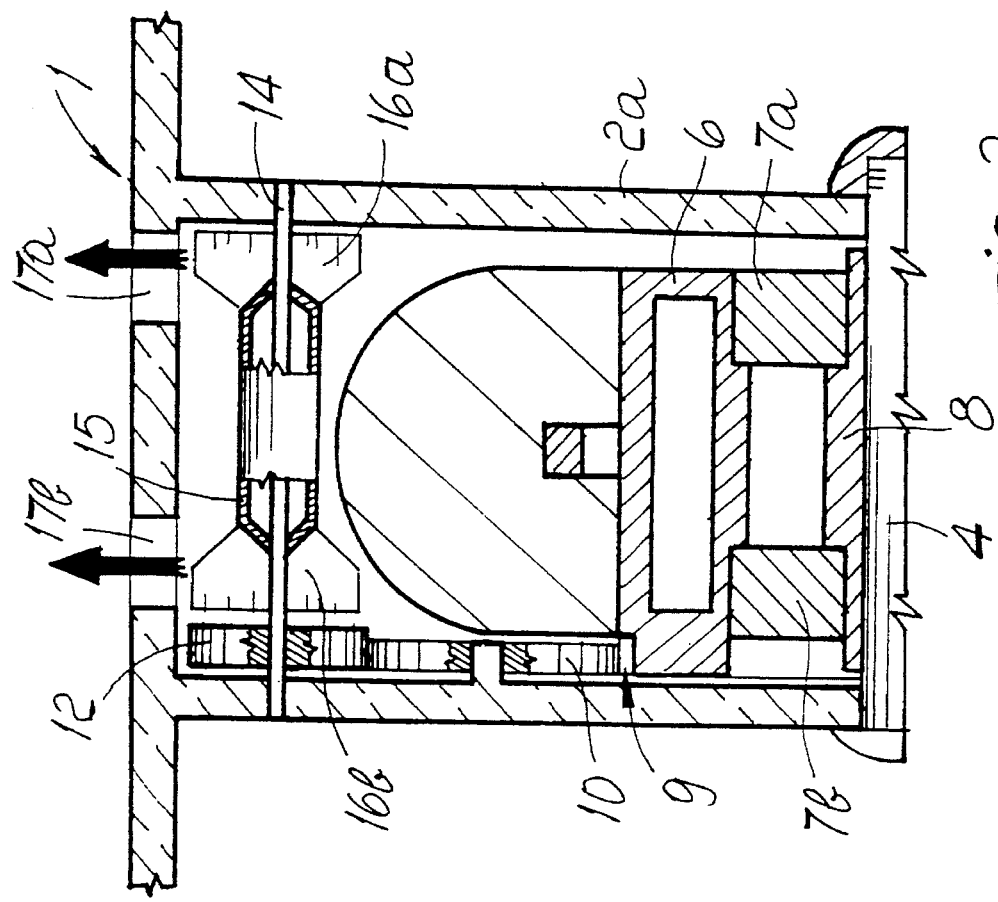
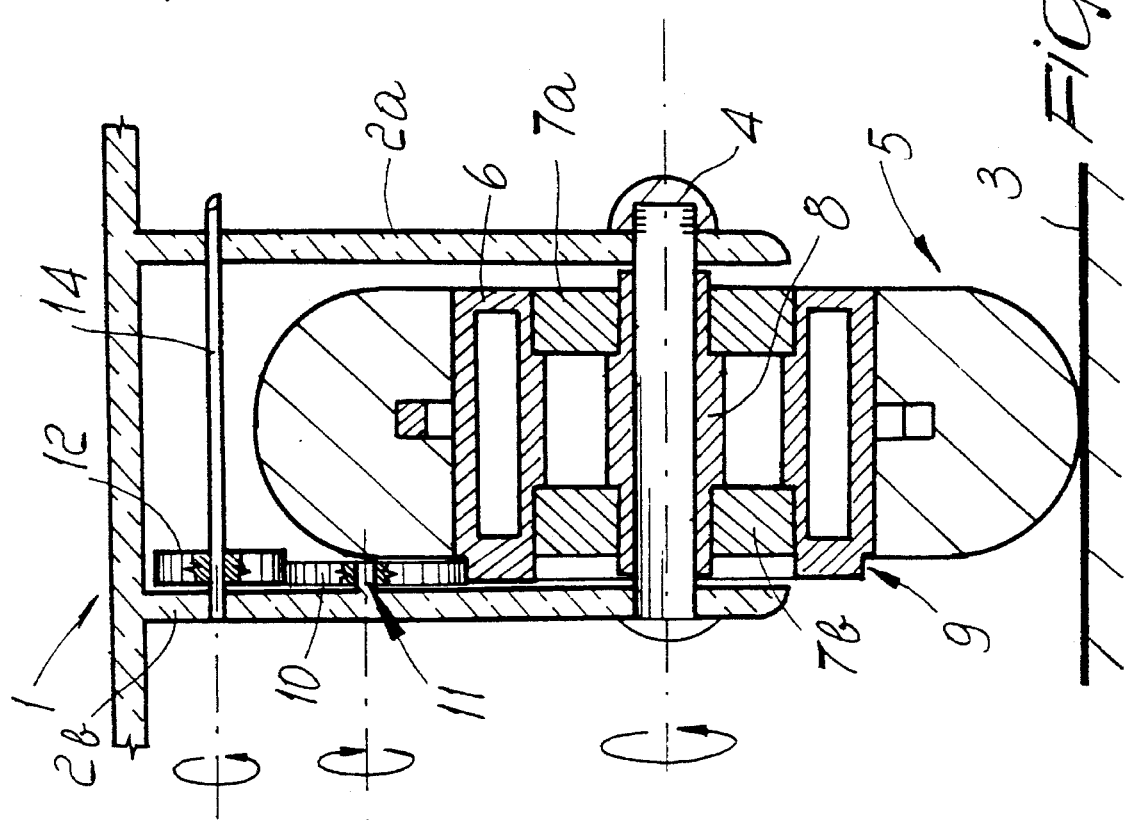

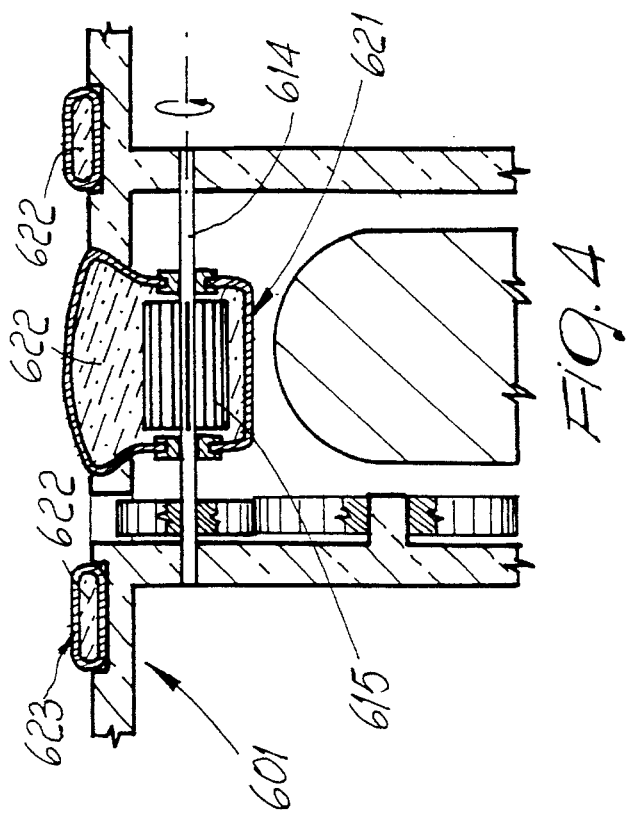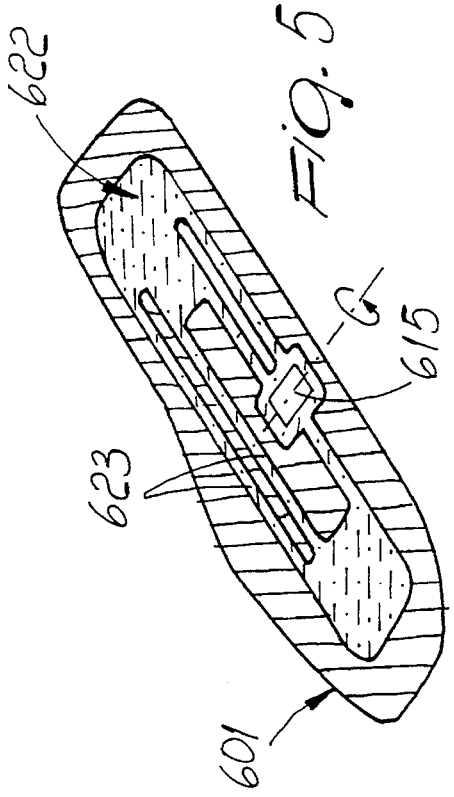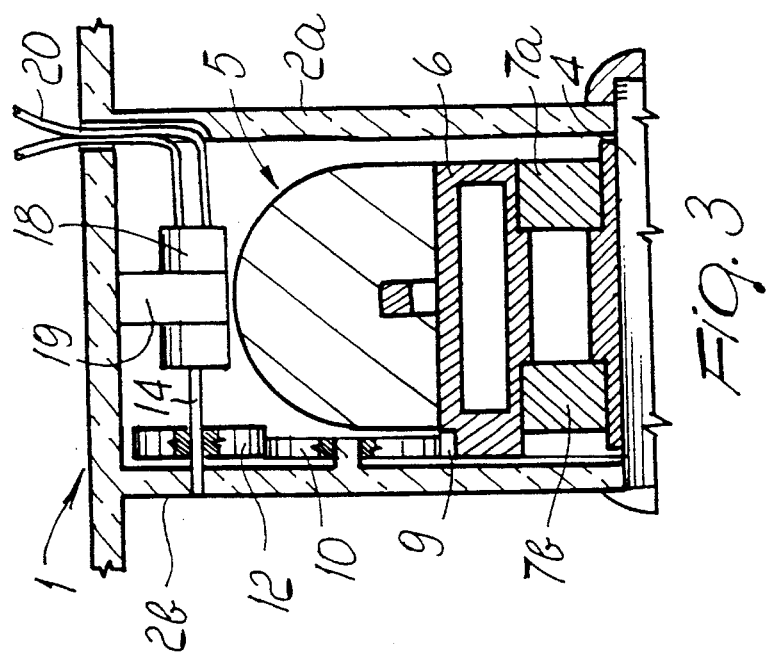

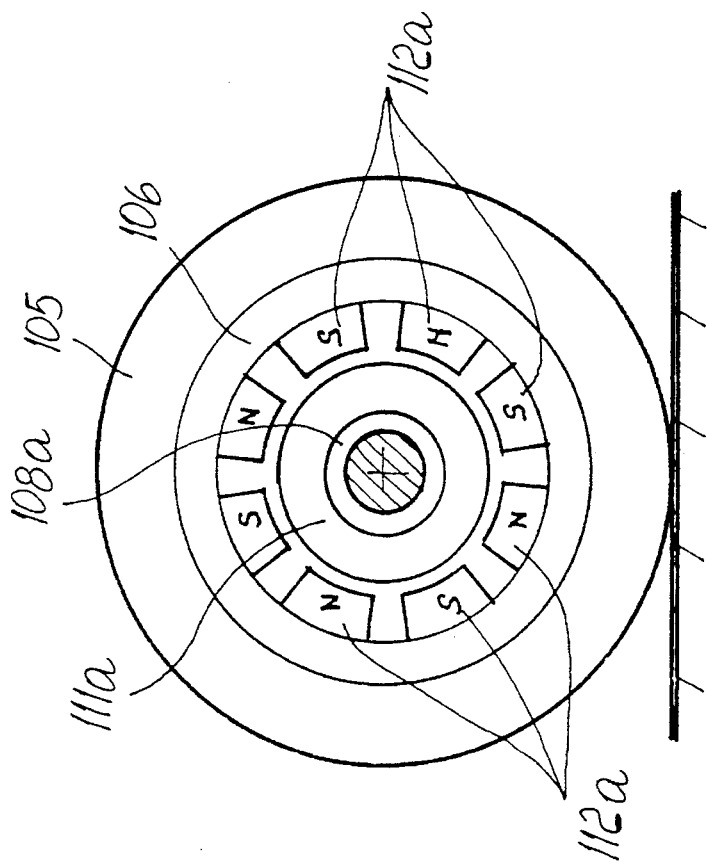
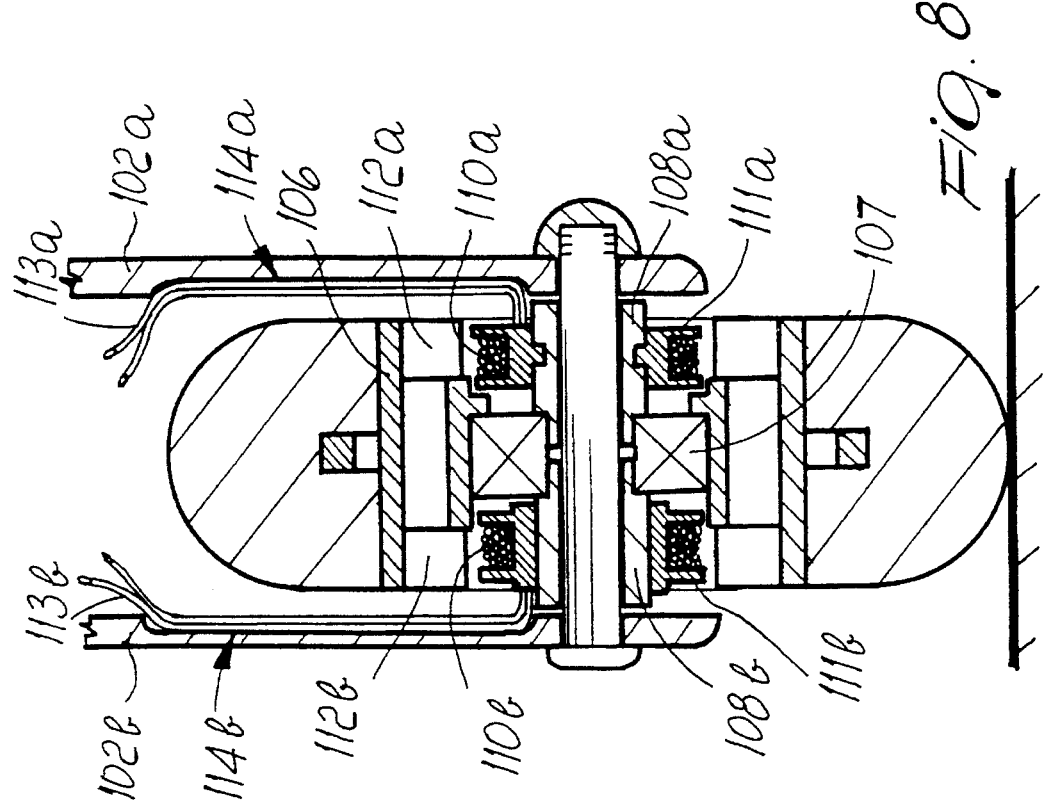
Fig. 9
Fig. 8

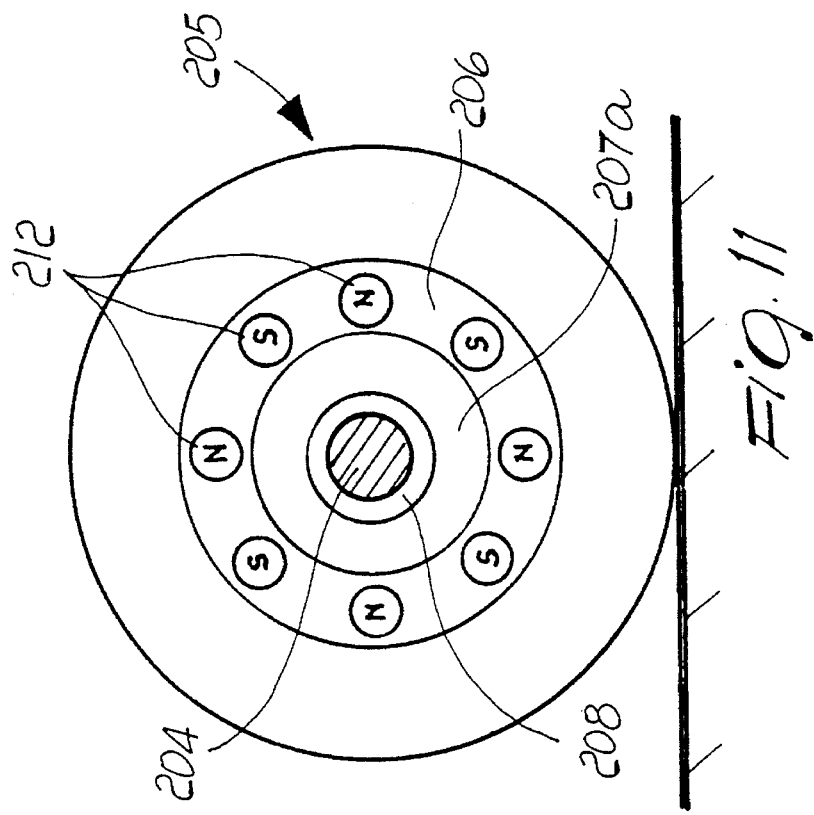
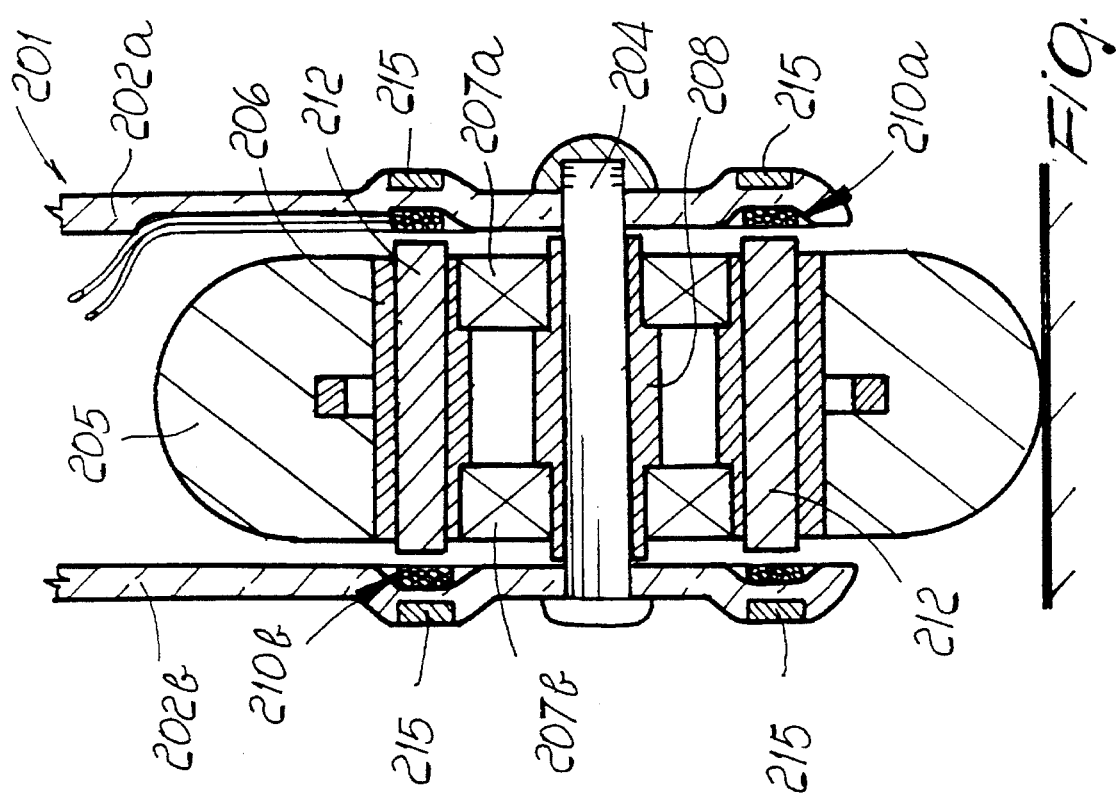
Fig. 11
Fig. 10

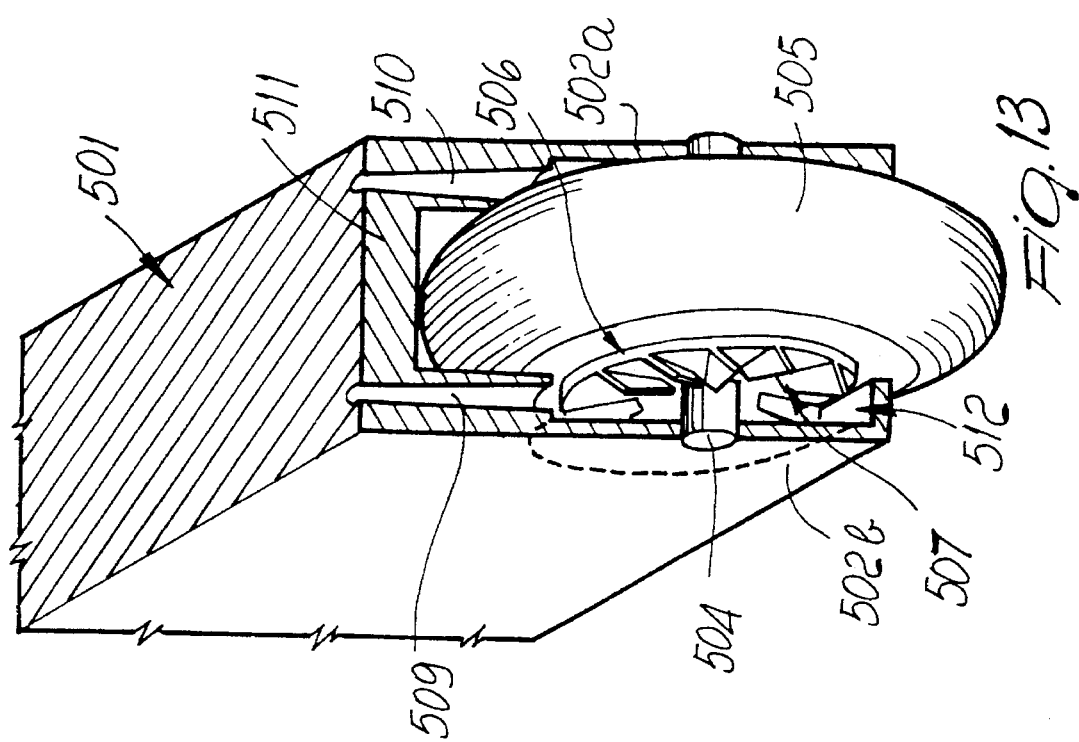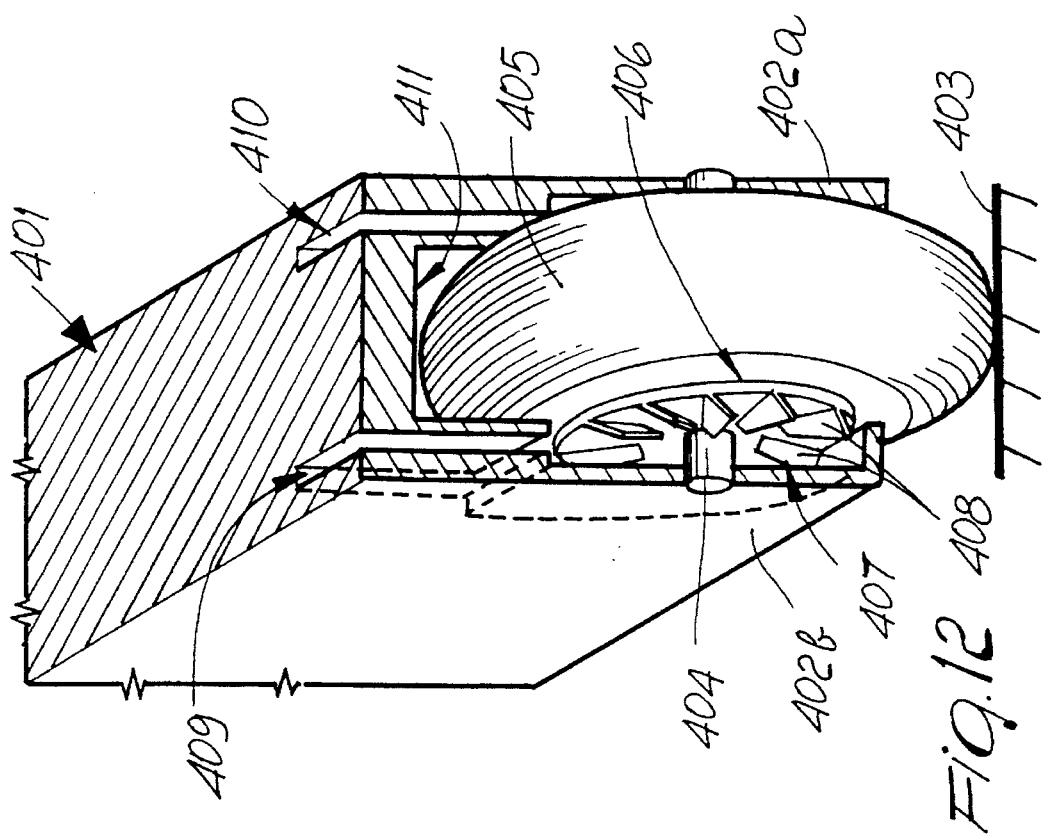

5,536,026

POWER GENERATOR DEVICE PARTICULARLY FOR WHEELED SPORT IMPLEMENTS

This application is a division of application Ser. No. 08/039,475, filed Apr. 26, 1993, now U.S. Pat. No. 5,390,941 which is a continuation of PCT/EP92/02004, filed Aug. 31, 1992 pending.

BACKGROUND OF THE INVENTION

The present invention relates to a power generator device particularly for wheeled sports implements, such as roller skates, ski-rolls and similar.

The need to have available, during sports practice, data related for example to the momentary or average speed, to the distance covered, to the time used to cover said distance etc. is currently strongly felt in sports.

All this data can potentially be acquired by means of the appropriate devices, for which, however, an adequate power source must be available.

The power source is usually constituted by batteries or accumulators, which however, are heavy and bulky and therefore not easy to use.

Batteries or accumulators also require maintenance and constant checking of their charge.

Furthermore, modern footwear manufactured of plastics is often the cause of foot perspiration. This limits the comfort of the user as well as sports performance.

SUMMARY OF THE INVENTION

The aim of the present invention is to overcome the problems described above in the known footwear, by providing a device for generating power intended to supply devices which can be used during sports practice and allows cooling of the foot of the user.

Within the scope of the above aim, an important object is to provide a device adapted to generate power only when actually needed.

Another important object is to provide a device adapted to power accessory devices, such as a fan, a compressor, a cooling system, a light source, or a heating resistor, without this requiring the user to carry auxiliary power supply sources such as batteries or accumulators whose charging state has to be checked before use.

Another important object is to provide a device which can be applied at the sports implement without substantially changing its shape and size.

Not least object is to provide a device which is reliable and safe in use and has low manufacturing costs.

This aim, these objects and others which will become apparent hereinafter are achieved by a power generator device, particularly for wheeled sports implements, comprising a rigid support having at least one wheel, said support being adapted to support a sole of an item of footwear, characterized in that it comprises a first power means, associated with said at least one wheel, and a second power means associated with said rigid support, said first power means being operatively connected to said second power means for generating power.

BRIEF DESCRIPTION OF THE DRAWINGS

Further characteristics and advantages of the invention will become apparent from the detailed description of some particular but not exclusive embodiments, illustrated only by way of non-limitative example in the accompanying drawings, wherein:

FIG. 1 is a sectional front view of the device, according to the invention;

FIG. 2 is a view, similar to the preceding one, of a device according to a second aspect of the invention;

FIG. 3 is a view, similar to the preceding ones, of a device according to a third aspect of the invention;

FIG. 4 is a view, similar to the one of FIG. 2, of a variation related to the cooling circuit;

FIG. 5 is a schematic view of the cooling circuit.

FIG. 8 is a sectional front view of still a further embodiment of the invention;

FIG. 9 is a partial side view of the device of FIG. 8;

FIG. 10 is a sectional front view of a device according to a further aspect of the invention;

FIG. 11 is a a partial side view of the device of FIG. 10;

FIG. 12 is a partially sectioned perspective view of a device according to still a further aspect of the invention;

FIG. 13 is a view similar to the preceding one, showing a variation of the device, according to the invention;

DETAILED DESCRIPTION OF THE PREFERRED EMBODIMENTS

Figure 7:
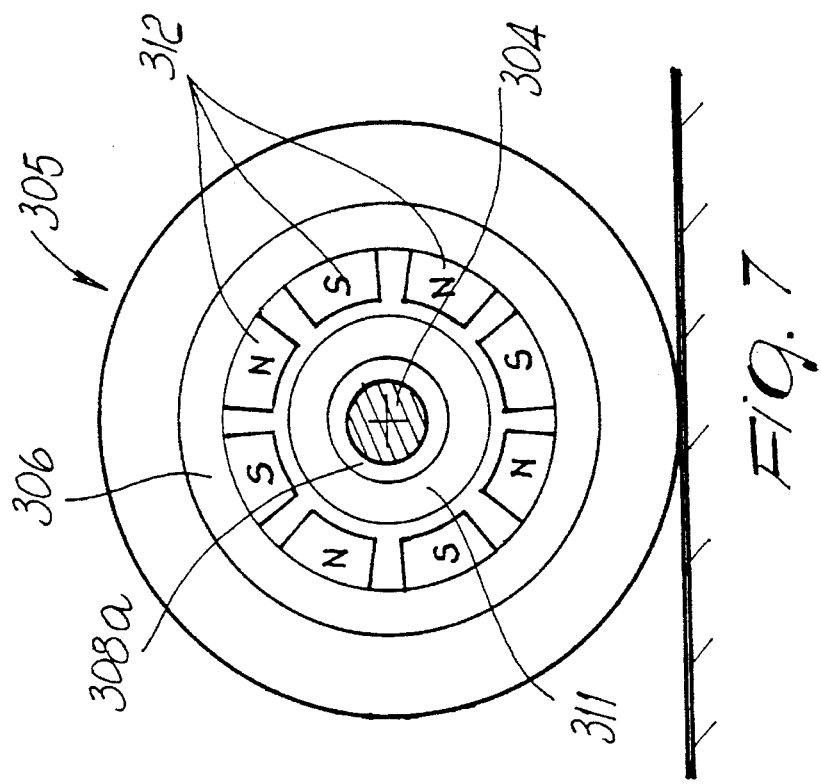
FIG. 7 is a partial side view of the device of FIG. 6.

FIGS. 1–5 show a typical wheeled sports implement such as, for example, a skate composed of a rigid support, designated by the reference numeral 1 and substantially C-shaped with wings 2a and 2b directed toward the ground 3.

An item of footwear can be associated with the support 1, while a plurality of wheels 5 are pivoted between the wings 2a and 2b by means of adapted first pins 4 (only one wheel is shown in the drawings).

The wheel comprises a hub 6 which interacts with a pair of bearings 7a and 7b which are in turn associated with a sleeve, designated by the reference numeral 8, which is arranged concentrically to the pin 4.

At least one first gear is laterally associated with the hub 6 and is constituted by a first toothed wheel 9 which interacts with a second gear which is constituted by a second toothed wheel 10.

Said second toothed wheel is pivoted to a second pin 11 which protrudes inside the wing 2b and provides motion, by means of a third toothed wheel 12, to a transmission shaft 14 which is arranged transversely to the wings 2a and 2b.

Said transmission shaft allows to generate power intended to supply devices which can be used during sports practice, or to cool the item of footwear associated with the support 1; thus, FIG. 2 shows a fan 15 which is keyed to the transmission shaft 14 and is provided, at its ends, with a pair of vanes 16a and 16b which direct the flow of air created by them at adapted openings 17a and 17b defined on the overlying support 1.

As an alternative shown in FIG. 3, the motorized shaft 14 interacts with a current generator 18 which is rigidly associated with the overlying support 1 by means of an adapted bracket 19; adapted cables 20 extend from said generator for connection to devices which can be used during sports practice, such as for example compressors, cooling systems, lamps, speed indicators.

FIG. 4 shows a fan 615 keyed to the transmission shaft 614 and contained in a tank 621 which contains coolant fluid 622. The tank 621 is connected to one or more cooling ducts, designated by the reference numeral 623, whose path extends between the sole of the item of footwear and the support 601.

Advantageously, said one or more cooling ducts and said tank are arranged at adapted seats defined on said support.

Figure 6:
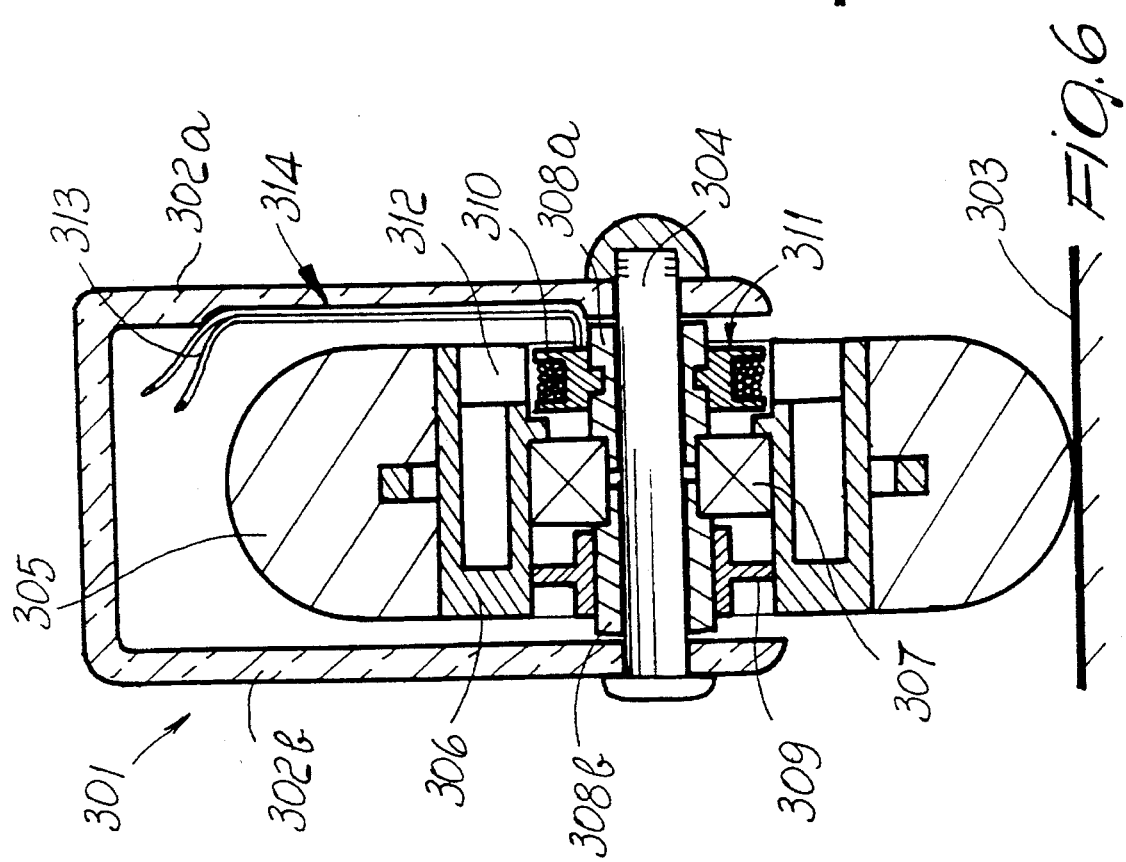
FIG. 6 is a sectional front view of a device according to a further aspect of the invention.

With particular reference to FIGS. 6–7, a skate composed of a rigid support, designated by the reference numeral 301, is substantially C-shaped and has wings 302a and 302b directed toward the ground 303.

An item of footwear can be associated with the support 301, and wheels 305 are pivoted between the wings 302a and 302b by means of an adapted pin 304.

The wheel comprises a hub 306 which interacts with a single central bearing 307 which is in turn associated with a pair of sleeves, designated by the reference numerals 308a and 308b, which are arranged concentrically to the pin 304.

A spacer 309 is arranged laterally to the central bearing 307, and a winding 310 is located on the opposite side and is wound on the sleeve 308a or on a spool 311 which is keyed to said sleeve.

A plurality of magnets 312, rigidly associated with the hub 306 of the wheel 305, is arranged concentrically to the winding 310.

The magnets 312 are arranged sequentially with opposite polarities.

Said polarities are hereinafter indicated in the drawings by the letters "S" and "N".

Cables 313 extend from the spool 311, are partially accommodated in adapted channels 314 defined on the wing 302a and run up to a connector or a device which is associated with the item of footwear or can be held by the user.

Of course the magnets can be arranged at the sleeves, concentrically to the pin 304, and the winding with the spool can be arranged at the hub 306; in this case, adapted brushes suitable to allow power transmission are provided at the wings of the support 301.

FIGS. 8 and 9 for example illustrate a further embodiment, wherein the windings 110a and 110b are provided at both sides of the central bearing 107 and are wound on the sleeves 108a and 108b or on a pair of spools 111a and 111b which are keyed on said sleeves.

Adapted magnets 112a and 112b, arranged sequentially with respect to one another with opposite polarities, are located coaxially to each one of the spools 111a and 111b.

In this case, too, adapted cables 113a and 113b extend from each one of the spools 111a and 111b, are accommodated in adapted channels 114a and 114b defined within the wings 102a and 102b and allow to supply power to adapted devices.

The magnets 112a and 112b are rigidly coupled to the hub 106 of the wheel 105.

FIGS. 10 and 11 illustrate a further embodiment of the invention, wherein the wheel 205 again comprises a hub 206 which interacts with a pair of bearings 207a and 207b which are arranged at the lateral ends of said hub and interact with an adapted sleeve 208 which is coaxial to the pin 204 for the pivoting of the wheel 205 to the wings 202a and 202b of the support 201.

A plurality of first magnets 212, provided with opposite polarities at their ends, is located at the hub 206 transversely to the wheel 205 and thus along axes which are parallel to the pin 204 and in a circular arrangement.

The first magnets are provided in an even number and are uniformly spaced from one another.

The length of said first magnets is slightly greater than the thickness of the wheel 205.

Adapted seats for second magnets 215, which have sequentially opposite polarities, are provided at the surface of the wings 202a and 202b which does not face the ends of the facing first magnets 212.

Further seats for a pair of windings 210a and 210b are provided on the surface of the wings 202a and 202b which instead face the first magnets 212.

With reference to FIG. 12, a skate has a rigid support 401, which is substantially C-shaped and has wings 402a and 402b directed toward the ground 403.

An item of footwear can be associated with the support 401 in an upward position, and a wheel 405 can be pivoted between the wings 402a and 402b by means of an adapted first pin 404.

Said wheel comprises a hub 406, and at least one fan 407 is associated therewith or rigidly coupled thereto or obtained monolithically therewith.

Said fan is provided with a plurality of vanes 408 which protrude beyond the perimetric edge of the hub 406, and is associated with one or both of the hubs of said wheel.

Said fan allows to generate a flow of air which affects one or more channels, designated by the reference numerals 409 and 410, which are defined at the wings 402a and 402b or are obtained by providing appropriate shoulders which protrude at right angles with respect to the base 411 of the support along a plane which is parallel to the plane of said wings.

Said channels affect the entire thickness of the support, and adapted openings or ducts are provided at the ends of such channels, on said item of footwear, to convey the flow into said item of footwear, so as to cool the foot.

Figure 15:
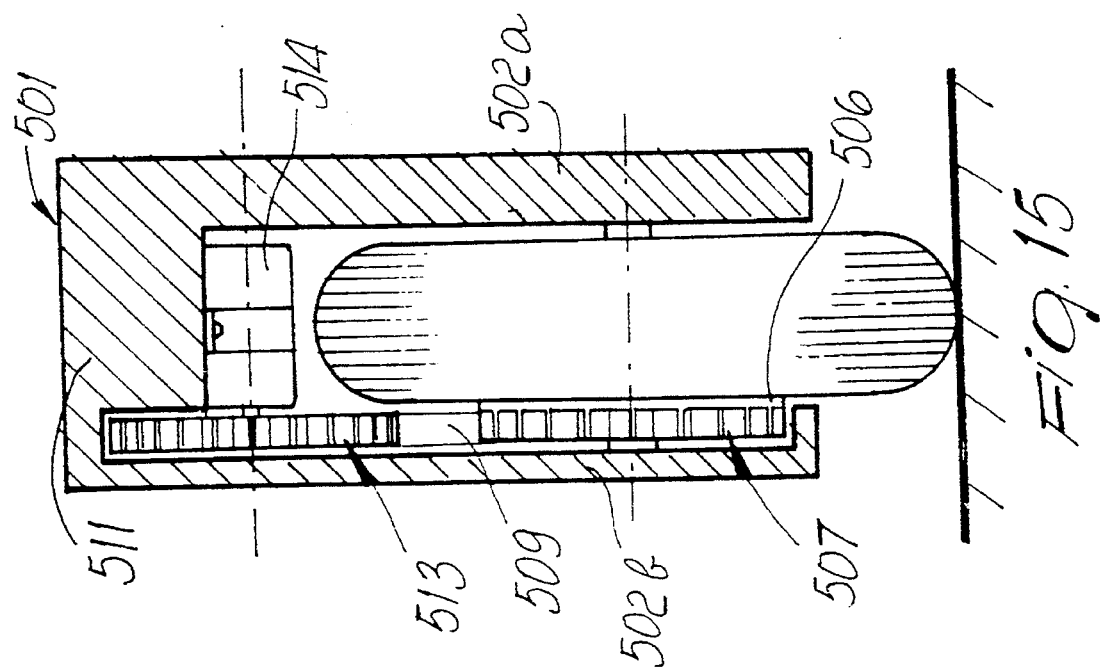
FIG. 15 is a front sectioned view of the device of FIGS. 13–14.
Figure 14:
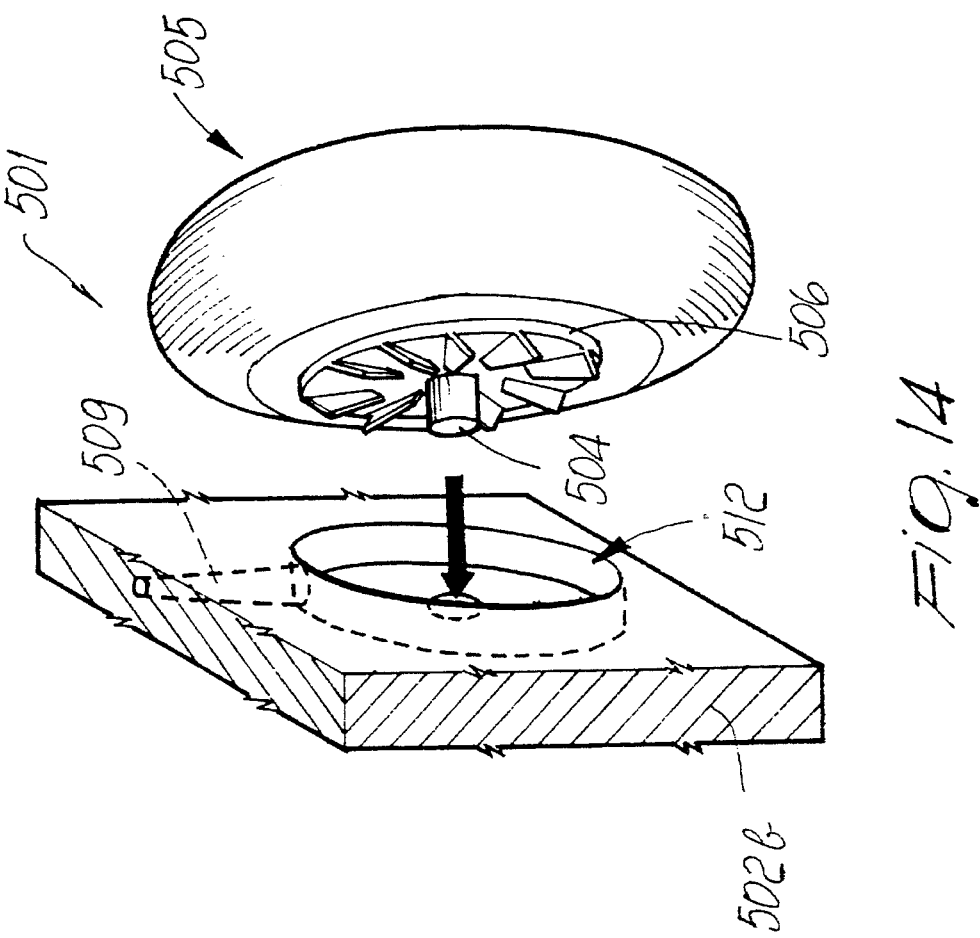
FIG. 14 is a perspective exploded view of the device of FIG. 13.

FIGS. 13–15 illustrate a further embodiment of the invention, wherein a hub 506 and a fan 507 are arranged at an adapted and complementarily shaped seat 512 defined on one or both of the wings 502a and 502b of the support so as to allow more efficient use of the flow generated during sports practice.

As an alternative to cooling the inside of the item of footwear, the channels 509 and 510 can advantageously have a conical shape whose apex is directed toward the base 511 of the support 501, so as to direct the flow of air generated by the fan 507 at an adapted turbine 513 which is arranged above the fan in an adapted second seat defined on the wing 502b and on whose axis the shaft of an electric power generator 514 is keyed.

Said generator is intended to supply power to devices which can be used during sports practice, such as for example compressors, cooling systems, lamps, speed indicators.

It has thus been observed that the invention has achieved the intended aim and objects, a device having been provided which allows the athlete to perform sports practice in conditions of maximum healthiness for the foot, by virtue of the ventilation which can be achieved on said foot, and furthermore allows to activate an electric power generator for supplying power to devices which can be used during said sports practice.

The device according to the invention is susceptible to numerous modifications and variations, all of which are within the scope of the same inventive concept.

The materials and the dimensions which consitute the individual components of the device may also be the most pertinent according to the specific requirements.

We claim:

1. A power generator device in combination with a wheeled sports implement, comprising:

at least one wheel with a hub;

a substantially rigid support;

means for rotatably supporting said at least one wheel to said rigid support;

an item of footwear having a sole which is supported by said rigid support; and power means for generating power from rotation of said at least one wheel;

wherein said means for supporting said at least one wheel comprises: a pair of wings of said rigid support; a pin interconnected between said pair of wings; and a hub of said at least one wheel which is rotatably supported about said pin, said power means comprising: first magnets supported by said hub; second magnets supported by said pair of wings; and windings supported by said pair of wings and interposed between said first and second magnets.

2. A power generator device in combination with a wheeled sports implement, comprising:

at least one wheel with a hub;

a substantially rigid support;

a pair of wings of said rigid support;

a pin interconnected between said pair of wings;

a hub of said at least one wheel which is rotatably supported about said pin;

an item of footwear having a sole which is supported by said rigid support; and a power generator for generating power from rotation of said at least one wheel;

wherein said power generator comprises: first magnets supported by said hub; second magnets supported by said pair of wings; and windings supported by said pair of wings and interposed between said first and second magnets.

3. A power generator device in combination with a wheeled sports implement, comprising:

at least one wheel with a hub;

a substantially rigid support;

a pair of wings of said rigid support;

a pin interconnected between said pair of wings;

a hub of said at least one wheel which is rotatably supported about said pin;

an item of footwear having a sole which is supported by said rigid support; and a power generator for generating power from rotation of said at least one wheel;

wherein said power generator comprises: first magnets supported by said hub; second magnets supported by said pair of wings; and windings interposed between said first and second magnets.

* * * * *